United States Patent [19]

Benton et al.

[11] Patent Number: 4,773,282
[45] Date of Patent: Sep. 27, 1988

[54] PISTON ROD ASSEMBLY INCLUDING AN INJECTION BONDED PISTON HEAD AND FABRICATION METHOD

[75] Inventors: Terry L. Benton; William Dirkin, both of Portage; Charles E. Lund, Kalamazoo, all of Mich.

[73] Assignee: Pneumo Abex Corporation, Boston, Mass.

[21] Appl. No.: 34,770

[22] Filed: Apr. 6, 1987

[51] Int. Cl.[4] .............. G05G 1/00; F16J 1/14; B25G 3/34
[52] U.S. Cl. .................. 74/579 R; 92/187; 92/212; 403/267
[58] Field of Search .............. 74/579 R, 579 E; 156/29, 4, 273.9, 274.2, 303.1, 304.5; 123/197 A, 197 AB, 197 AC; 403/265–267; 92/212, 214, 222, 248, 187

[56] References Cited

U.S. PATENT DOCUMENTS

| | | | |
|---|---|---|---|
| 1,684,862 | 9/1928 | Gay | 92/187 |
| 1,789,840 | 1/1931 | Rathbun | 92/187 |
| 2,772,758 | 12/1956 | Vaessen | 403/267 |
| 2,804,322 | 8/1957 | Herzog | 403/267 |
| 3,048,433 | 8/1962 | Doetsch | 403/267 |
| 3,069,210 | 12/1962 | Rogers et al. | 92/187 |
| 3,158,072 | 11/1964 | Detrez | 92/187 |
| 3,387,351 | 6/1968 | Roosen | 156/294 |
| 3,574,293 | 4/1971 | Vriend | 92/187 |
| 3,969,989 | 7/1976 | Maurer et al. | 92/212 |
| 4,172,678 | 10/1979 | Schowald et al. | 403/267 |
| 4,207,779 | 6/1980 | Papst | 74/579 E |
| 4,295,388 | 10/1081 | Mialon et al. | 74/579 R |
| 4,359,913 | 11/1982 | Mahlke | 74/579 E |
| 4,376,393 | 3/1983 | Mori | 74/579 R |
| 4,432,824 | 2/1984 | Cook et al. | 156/294 |
| 4,561,164 | 12/1985 | Wossner et al. | 74/579 R |
| 4,588,467 | 5/1986 | Tani et al. | 156/294 |
| 4,600,222 | 7/1986 | Appling | 156/294 |
| 4,610,740 | 9/1986 | Nordstrom | 156/294 |
| 4,648,926 | 3/1987 | Ross et al. | 156/294 |
| 4,683,810 | 8/1987 | Afimiwala | 403/267 |

FOREIGN PATENT DOCUMENTS 940932 11/1963 United Kingdom .

Primary Examiner—Gary L. Smith
Assistant Examiner—Vinh Luong
Attorney, Agent, or Firm—Renner, Otto, Boisselle & Lyon

[57] ABSTRACT

Piston rod assembly includes a piston head and rod which are formed separately and subsequently jointed together by injecting adhesive through a porting passage in the piston head into an annular space formed by an internal groove in the piston head and an external surface of the rod to provide a bonded joint therebetween. The piston head includes a radially enlarged center dam portion and a pair of reduced diameter end portions extending coaxially from opposite sides of the center dam portion. The internal groove extends axially beyond opposite sides of the center dam portion for a substantial portion of the length of the reduced diameter end portions. The reduced diameter end portions are externally tapered radially inwardly from opposite sides of the enlarged center dam portion toward opposite ends of the reduced diameter end portions to provide a gradual build-up of stiffness in the piston head from the opposite ends of the bonded joint toward the middle. Also, integral rod sleeve portions extend from opposite ends of the reduced diameter end portions over a substantial portion of the length of the rod to provide a barrier around the rod impermeable to hydraulic fluid.

13 Claims, 1 Drawing Sheet

4,773,282

PISTON ROD ASSEMBLY INCLUDING AN INJECTION BONDED PISTON HEAD AND FABRICATION METHOD

BACKGROUND OF THE INVENTION

This invention relates generally, as indicated, to a piston rod assembly, the piston head of which is made separately from the piston rod and subsequently bonded thereto. Also, this invention relates to a method of fabricating such piston rod assembly.

Making the piston head and rod separately not only facilitates their fabrication, but permits them to be made out of different materials. This is particularly advantageous in applications where, for example, it is desired to make the rod out of relatively high strength-to-weight fibrous composite materials for reduced weight, as when the piston rod assembly is part of a fluid actuator used in flight controls for high performance aircraft and the like.

Also, making the piston rod (as well as the cylinder walls) of the actuator out of fibrous composite materials would be desirable in applications where ballistic tolerance is an objective because of the frangibility of such materials. Composites are relatively brittle and tend to fragment when impacted, thus causing very little tendency to jam. Accordingly, if two or more hydraulic actuators are connected in parallel, and the composite piston rod of one of the actuators is struck by a ballistic projectle, it will not jam and thus prevent the other actuator(s) from functioning.

Such a piston rod assembly should be of a relatively low cost, envelope efficient design. Also, if the rod is made of composite materials, a suitable barrier impermeable to hydraulic fluid and a durable wear surface should be provided over the exposed surface of the rod. In addition, the joint between the piston head and rod should be able to withstand the stresses incurred during use of the actuator. Furthermore, an efficient method of assembling the piston head onto the rod and securing same thereto should be provided.

SUMMARY OF THE INVENTION

With the foregoing in mind, it is a principal object of this invention to provide a piston rod assembly in which the piston head and rod are formed separately and subsequently joined together to provide a secure joint therebetween.

Another object is to provide such an assembly in which the joint between the piston head and rod is able to withstand relatively high stresses during use.

Still another object is to provide such an assembly in which the rod is made of fibrous composite materials for reduced weight and/or frangibility.

Yet another object is to provide such an assembly in which the exposed surface of the composite rod is provided with a barrier impermeable to hydraulic fluid and a durable wear surface.

Still another object is to provide a novel method of assembling the piston head onto the rod and securing same thereto.

These and other objects of the present invention may be achieved by providing a piston rod assembly including a piston head having a center dam portion and reduced diameter end portions on opposite sides thereof to permit an internal groove of substantial length to be formed in the piston head. A porting passage extends from the exterior of the piston head to the internal groove for the injection of adhesive into an annular space formed by the groove and the external surface of the rod to provide a bonded joint between the piston head and rod which extends over a substantial distance to minimize the shear stresses in the adhesive bond during use of the piston rod assembly.

When the rod is made of fibrous composite materials, the piston head is desirably provided with integral rod sleeve portions which completely cover the exterior surface of the rod that is exposed to hydraulic fluid to provide a barrier impermeable to such fluid and a durable wear surface. Tapered transition areas are also desirably provided between the piston head and rod sleeve portions after the piston head/sleeve has been assembled onto the rod and adhesively bonded thereto to provide a gradual build-up of stiffness around the adhesive bond so that peak stresses in the adhesive bond are minimized. The rod sleeve portions may be machined after the assembly has been completed to reduce their thickness so that they are sufficiently thin to prevent jamming of the actuator in the event that the rod sleeve portions should be impacted with a ballistic projectile.

During the assembly process, the head/sleeve is desirably shrink fitted onto the rod. After the assembly has returned to ambient temperature, a suitable adhesive is injected through the porting passage to fill the annular space between the piston head and rod. Then the porting passage may be drilled out to permit an interference fit ball to be inserted into the porting passage to provide a seal against hydraulic fluid. If desired, the head/sleeve may also be chrome-plated for increased wear.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
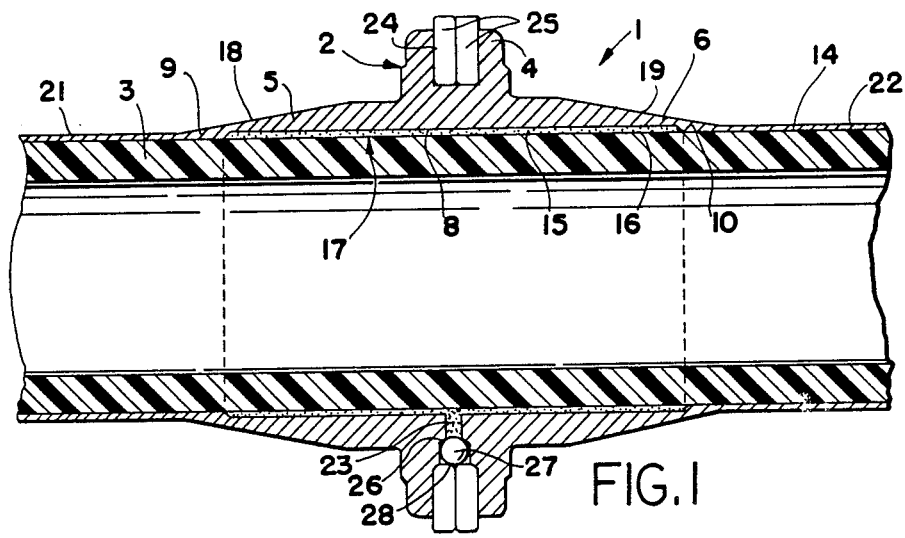
FIG. 1 is an enlarged fragmentary longitudinal section schematically showing a preferred form of piston rod assembly in accordance with this invention.

Referring now in detail to the drawings, in FIG. 1 there is shown a preferred form of piston rod assembly 1 in accordance with this invention which may be used, for example, in fluid actuators for flight controls for high performance aircraft and other high pressure applications. The piston rod assembly 1 includes a piston head 2 and piston rod 3 which are made separately and subsequently assembled as described hereafter.

Piston head 2 is desirably machined from a single piece of metal such as stainless steel, and includes, in addition to the usual radially enlarged center dam portion 4, a pair of reduced diameter end portions 5, 6 extending coaxially from opposite sides thereof. End portions 5, 6 increase the overall length of the piston head, whereby an internal annular groove 8 of considerable length can be provided in the piston head for a purpose to be subsequently described.

Adjacent opposite ends 9, 10 of groove 8 the reduced diameter end portions 5, 6 desirably have an interference fit with the outer diameter of the piston rod 3 to seal off the ends of the groove, whereby the groove defines with the opposed external surface 14 of the piston rod an enclosed annular space 15 therebetween which is filled with a suitable adhesive 16 throughout its length to bond the piston head to the rod. Groove 8 may, for example, have a depth of approximately 0.015 inch and a length of approximately 1.75 inches when the outer diameter (O.D.) of the rod 3 and the inner diameter (I.D.) of the piston head 2 at its opposite ends are each approximately 1.12 inches; i.e., the groove length may be approximately one and one-half times the O.D. of the rod or I.D. of the piston head at its ends. Also, for such an O.D. rod, the enlarged center dam 4 may, for example, have a length of approximately 0.45 inch and each of the reduced diameter end portions 5, 6 a length of approximately 0.8 inch as measured from opposite sides of the center dam portion.

Because of the substantial length of the annular groove 8 which is filled with adhesive, a bonded joint 17 is formed between the piston head and rod which extends over a substantial distance (the length of the groove) to minimize the shear stresses in the adhesive bond during use of the piston rod assembly. Also, the reduced diameter end portions 5, 6 desirably have tapered (ramped) transition areas 18, 19 which gradually taper radially inwardly from the enlarged center dam portion 4 toward the opposite ends 9, 10 thereof to provide a gradual build-up of stiffness in the piston head surrounding the joint 17 to minimize peak stresses in the joint during use of the assembly. If the shear stresses are too concentrated, premature failure (fracture) of the adhesive bond between the piston head and rod could occur. By matching the stiffness of the piston head to the rod, the piston head will pick up the load more gradually, thus minimizing peak stresses.

Piston rod 3 may also be made out of metal if desired. However, another advantage is forming the piston head 2 and rod 3 separately is that the rod need not be made out of the same material as the piston head. This is particularly advantageous in applications where weight and/or frangibility are important considerations, in that it permits the piston rod to be made out of relatively high strength-to-weight fibrous composite materials such as high modulus graphite filament wound fiber impregnated with a suitable resin such as epoxy, polyester, polyimide, etc. However, in that event the exterior surface of the rod that is exposed to hydraulic fluid during use should be provided with a barrier impermeable to such fluid. Also, a durable wear surface should be provided on such exterior surface.

To that end, the piston head 2 is desirably provided with integral rod sleeve portions 21, 22 extending from opposite ends of the reduced diameter end portions 5, 6 over the remaining exposed length of the piston rod. The I.D. of each of the rod sleeve portions 21, 22 desirably substantially corresponds to the I.D. of the reduced diameter end portions 5, 6 at the opposite ends 9, 10 thereof. Also, if frangibility of the rod is desired, the rod sleeve portions 21, 22 should be made sufficiently thin so as not to cause jamming of the actuator if the rod is impacted by a ballistic projectile. For example, the rod sleeve portions 21, 22 may have a thickness of approximately .014 inch.

However, prior to assembly, the rod sleeve portions 21, 22 are desirably made substantially thicker, for example, approximately 0.060 inch thick, to facilitate handling of the head/sleeve during the assembly process, and to aid in the shrink fitting of the head/sleeve onto the rod as described hereafter. By the same token, the reduced diameter end portions 5, 6 of the piston head are desirably not tapered until after the assembly is complete.

Figure 2:
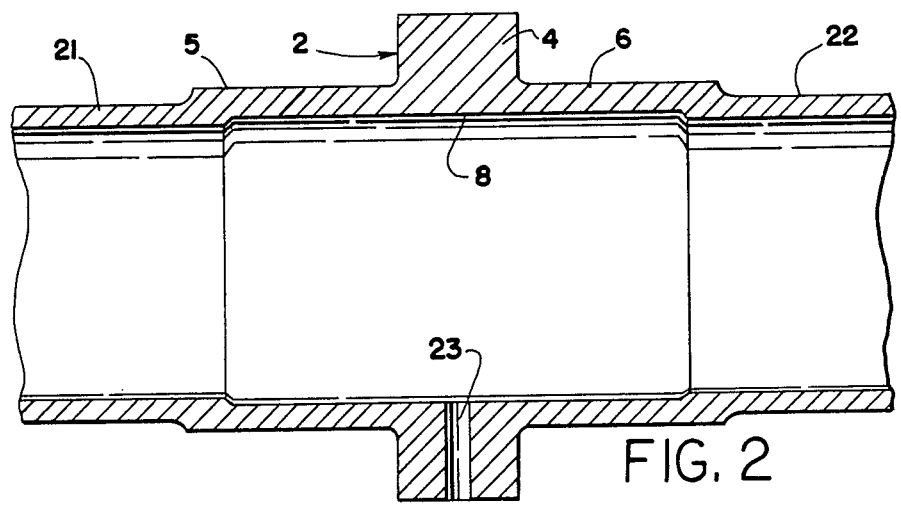
FIG. 2 is an enlarged fragmentary longitudinal section schematically illustrating the piston head prior to assembly onto the rod.
Figure 3:
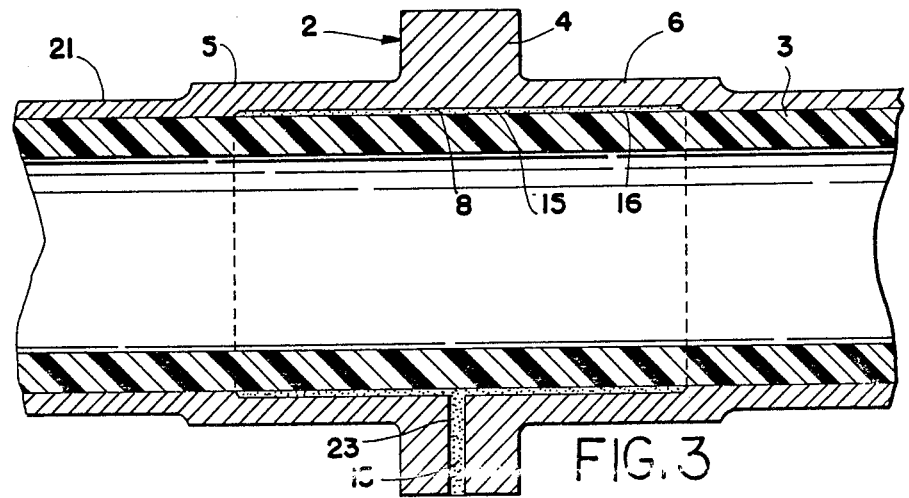
FIG. 3 is an enlarged fragmentary longitudinal section schematically showing the piston head assembly onto the rod and bonded thereto before performing the final machining operations on the piston head.

Prior to assembly, the piston head 2 is desirably initially machined to the configuration shown in FIG. 2, with reduced diameter end portions 5, 6 of substantially uniform thickness over substantially their entire length, and rod sleeve portions 21, 22 substantially thicker than the final desired thickness as noted above. However, during the initial machining of the head/sleeve, the internal groove 8 is machined to the final desired depth, and a porting passage 23 is drilled through the piston head and into communication with the groove 8 preferably through the center of the center dam portion 4 so that it intersects the groove intermediate the ends of the length thereof. The head/sleeve is then desirably heated, for example, to a temperature of approximately 390° F., to expand the head/sleeve. At the same time, the rod may be cooled, for example, to approximately $-100°$ F., to cause the rod to contract. Then the head-sleeve is slid over the rod as schematically shown in FIG. 3, and the assembled parts are allowed to return to ambient temperature, which results in a shrink fit between the head/sleeve and rod that is important in obtaining the desired close tolerances therebetween. Next a suitable adhesive 15 is injected, under high pressure, through the porting passage 23 until the annular space 16 formed by the groove and rod is completely filled with adhesive as further schematically shown in FIG. 3. Before the head/sleeve is shrink fitted onto th rod, the O.D. of the rod should be roughened to provide microscopic passages between the O.D. of the rod and I.D. of the sleeve for the escape of air from the annular space 16 during the injection of adhesive into such space.

After the adhesive has cured, an annular groove 24 may be machined in the O.D. of the center dam portion 4 for receipt of one or more ring seals 25 therein (see FIG. 1). Before inserting the ring seals into the groove, the porting passage 23 is desirably drilled out to provide a seat 26 for a ball 27 which may be press fitted into the passage and against the seat to provide a seal against hydraulic fluid from entering the porting passage 23 and coming into contact with the adhesive and causing the bond to deteriorate. During the finish grinding of the ring seal groove 24, a flat 28 may be formed on the radial outer surface of the ball 27 to provide for close seating engagement of the ring seals 25 against the ball when the ring seals are inserted into the groove.

Also after the adhesive has cured, the final machining is performed on the head/sleeve, during which the rod sleeve portions 21, 22 are machined to the final desired thickness and the reduced diameter end portions 5, 6 are machined to provide the desired tapered (ramped) transition areas 18, 19 between the enlarged center dam portion 4 and rod sleeve portions 21, 22. Also, if desired, the external surface of the head/sleeve may be chrome plated for increased wear.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A piston rod assembly comprising a piston rod and a piston head, said rod extending coaxially beyond said piston head, said piston head having an internal annular groove defining with an external surface of said rod an annular space filled with adhesive to provide a bonded joint between said piston head and rod, said piston head engaging said rod at the ends of said groove to seal off said ends of said groove, said piston head including a radially enlarged center dam portion and a pair of reduced diameter end portions extending coaxially from opposite sides of said center dam portion, said center dam portion having an axial thickness, and said internal groove having an axial length greater than said axial thickness of said center dam portion, said annular groove extending axially beyond said opposite sides of said center dam portion for a substantial portion of the length of said reduced diameter end portions.

2. The assembly of claim 1 wherein said reduced diameter end portions have opposite ends engaging said rod to seal off said opposite ends of said groove.

3. The assembly of claim 2 wherein said opposite ends of said reduced diameter end portions have an interference fit with said rod.

4. The assembly of claim 1 wherein said reduced diameter end portions are externally tapered radially inwardly from said opposite sides of said center dam portion toward opposite ends of said reduced diameter end portions to provide a gradual build-up of stiffness in said piston head from opposite ends of said bonded joint toward the middle.

5. The assembly of claim 1 wherein said piston head is made of metal and said rod is made of composite fibrous materials.

6. The assembly of claim 5 further comprising integral rod sleeve portions extending from opposite ends of said reduced diameter end portions over a substantial portion of the length of said rod to provide a barrier around said rod impermeable to hydraulic fluid.

7. The assembly of claim 6 wherein said rod sleeve portions have a radial thickness of approximately 0.014 inch.

8. The assembly of claim 6 wherein said reduced diameter end portions are externally tapered radially inwardly from the opposite sides of said enlarged center dam portion toward the opposite ends of said reduced diameter end portions to provide a gradual build-up of stiffness in said piston head from opposite ends of said bonded joint toward the middle.

9. The assembly of claim 1 further comprising a porting passage extending from the exterior of said piston head into communication with said internal groove to permit adhesive to be injected into said annular space.

10. The assembly of claim 9 wherein said piston head includes a radially enlarged center dam portion and a pair of reduced diameter end portions extending coaxially from opposite sides of said center dam portion, said internal groove extending axially beyond the opposite ends of said center dam portion for a substantial portion of the length of said reduced diameter end portions, said porting passage extending radially through the center of said center dam portion and communicating with said internal groove centrally of the length thereof.

11. The assembly of claim 1 wherein said annular groove has an axial length of approximately one and one-half the outer diameter of said rod.

12. A piston rod assembly comprising a piston rod and a piston head, said piston head having an internal annular groove defining with an external surface of said rod an annular space filled with adhesive to provide a bonded joint between said piston head and rod, a porting passage extending from the exterior of said piston head into communication with said internal groove to permit adhesive to be injected into said annular space, said piston head including a radially enlarged center dam portion and a pair of reduced diameter end portions extending coaxially from opposite sides of said center dam portion, said internal groove extending axially beyond said opposite sides of said center dam portion for a substantial portion of the length of said reduced diameter end portions, said porting passage extending radially through the center of said center dam portion and communicating with said internal groove centrally of the length thereof, said porting passage having a seat which is engaged by a ball press fitted into said passage to provide a seal against hydraulic fluid entering said passage and coming into contact with said adhesive.

13. The assembly of claim 12 further comprising an annular groove in the outer diameter of said center dam portion, and ring seal means in said annular groove in said center dam portion, said ball having a flat on a radial outer surface of said ball which is engaged by said ring seal means.

* * * * *